US012532879B2

(12) United States Patent
Danna

(10) Patent No.: US 12,532,879 B2
(45) Date of Patent: Jan. 27, 2026

(54) PORTABLE MOSQUITO REPELLING DEVICE

(71) Applicant: Zhu Danna, Kowloon (CN)

(72) Inventor: Zhu Danna, Kowloon (CN)

( * ) Notice: Subject to any disclaimer, the term of this patent is extended or adjusted under 35 U.S.C. 154(b) by 261 days.

(21) Appl. No.: 18/465,865

(22) Filed: Sep. 12, 2023

(65) Prior Publication Data

US 2025/0081960 A1    Mar. 13, 2025

(51) Int. Cl.
*A01M 29/12*      (2011.01)
(52) U.S. Cl.
CPC ....... *A01M 29/12* (2013.01); *A01M 2200/012* (2013.01)
(58) Field of Classification Search
CPC . A61L 9/122; A01M 29/12; A01M 2200/012; A01N 53/00; A01P 17/00
See application file for complete search history.

(56) References Cited

U.S. PATENT DOCUMENTS

| | | | | |
|---|---|---|---|---|
| 2019/0247532 | A1* | 8/2019 | Hsiao | A61L 9/032 |
| 2020/0254131 | A1* | 8/2020 | Sevy | A61L 9/14 |
| 2022/0105224 | A1* | 4/2022 | Vazquez Alvarez | A61L 9/013 |
| 2024/0042085 | A1* | 2/2024 | Hasik | A61L 9/037 |

* cited by examiner

*Primary Examiner* — Tuongminh N Pham
(74) *Attorney, Agent, or Firm* — Nitin Kaushik

(57) ABSTRACT

The present application provides a portable mosquito repelling device including a repelling device body. A case placing slot is located inside the repelling device body; the repelling device body and the case placing slot are connected with each other through a ring-shaped plate; the ring-shaped plate defines a set of air outlet holes, which are evenly distributed. The mosquito repellent essential oil, which contains natural plant components, is used instead of substances having medicinal properties, which are contained in the traditional mosquito repellents. The mosquito repellent essential oil does not contain harmful chemicals and has no toxic side effects on human health, reducing pollution to the environment. The mosquito repellent case is a detachable case, such that the user may use, after all the mosquito repelling essential oil in the case is volatilized, a new replacement case according to demands to continuously repel mosquitos.

6 Claims, 5 Drawing Sheets

PORTABLE MOSQUITO REPELLING DEVICE

TECHNICAL FIELD

The present disclosure relates to the field of mosquito repelling devices, and in particular to a portable mosquito repelling device.

BACKGROUND

Techniques of repelling mosquitos has significantly developed over past decades. Various methods are sought to effectively repel mosquitoes, especially disease-transmitting mosquitoes, to protect human health and to enable humans to live comfortably. Traditional mosquito repelling methods include using mosquito repellents, insecticide sprays, mosquito repellent candles and ultrasonic mosquito repellents. As technology develops, mosquito repelling technologies have been improved and innovated to provide more effective, convenient and environmentally friendly solutions.

Traditional mosquito repellent coils and insecticide sprays are common mosquito repellents. These repellents are burned or sprayed to emit smoke or vapour to repel mosquitos. However, while these repellents kill mosquitoes, these repellents may also release chemicals having medicinal properties that may have adverse effects on surrounding people, especially children and sensitive people. In addition, the repellents can only be used within a certain range, and may not be inconveniently used for people who are moving. Some electric mosquito repellents are available in the art, such as ultrasonic mosquito repellents. These repellents may repel mosquitoes by emitting ultrasonic waves. However, effectiveness of these repellents is often questioned and may cause pets or other animals at home to be uncomfortable.

SUMMARY OF THE DISCLOSURE

In order to solve the technical solutions in the background, the present disclosure provides a portable mosquito repelling device, including a repelling device body. A case placing slot is located inside the repelling device body. The repelling device body and the case placing slot are connected with each other through a ring-shaped plate. The ring-shaped plate defines a set of air outlet holes, which are evenly distributed.

A fan mounting disc is arranged at a lower part of an interior of the repelling device body, the fan mounting disc is disposed below the case placing slot, the fan mounting disc and the case placing slot are spaced apart from each other.

A mosquito repelling case is snapped into the case placing slot, and an end cap is threaded to an upper port of an interior of the mosquito repelling case.

In some embodiments, a hemispherical wind gathering shell is mounted inside the repelling device body. The hemispherical wind gathering shell is disposed at an outer side of the case placing slot. An upper portion of the hemispherical wind gathering shell is disposed at a lower side of the ring-shaped plate; a lower portion of the hemispherical wind gathering shell is arranged with a ring-shaped baffle, the ring-shaped baffle is disposed on an upper side of the fan mounting disc. A fan (not shown) is mounted on an upper side of the fan mounting disc. Fan blades of the fan are slightly lower than the ring-shaped baffle.

In some embodiments, a set of through holes are defined and located at an outer side of the mosquito repelling case, the set of through holes are evenly distributed, a through slot is defined out of the case placing slot.

In some embodiments, a power button is arranged at a lower part of a side of the repelling device body, and a Type-c power input port is arranged at a lower part of another side of the repelling device body.

In some embodiments, a middle of a lower side of the repelling device body defines a recess, a battery slot is arranged at the recess. A battery may be received in the battery slot. The battery may be a rechargeable battery. The rechargeable battery and a circuit board are mounted inside the repelling device body to ensure proper circuit connection.

In some embodiments, a set of rubber pads are arranged at a lower side of the repelling device body, and the set of rubber pads are arranged to form a ring. The set of rubber pads are configured to increase friction applied to the mosquito repelling case, preventing the mosquito repelling case from sliding around while in use.

In some embodiments, the mosquito repelling case is a detachable mosquito repelling case.

In some embodiments, the mosquito repellent essential oil is made by mixing peppermint essential oil, geranium oil, geraniol essential oil and lemongrass essential oil proportionally. A certain amount of inert ingredient (such as thermoplastic rubber), which serves as carrier, is added to the mixed oil. The mosquito repellent essential oil fills a container (in the present case, 70% of the thermoplastic rubber and 30% of the mosquito repellent essential oil are mixed, and injection moulding is achieved by performing a conventional process).

In some embodiments, the repelling device body is made of rigid PVC.

In some embodiments, the power button 4 controls a gear and a switch of the fan.

According to the present disclosure, a mosquito repellent essential oil, which contains natural plant components, is used instead of substances having medicinal properties, which are contained in the traditional mosquito repellents. The mosquito repellent essential oil does not contain harmful chemicals and has no toxic side effects on human health, reducing pollution to the environment. By configuring the device to be portable, the portable mosquito repelling device is applied both indoors and outdoors, such that a full range of protection from mosquitos is provided. The mosquito repellent case is a detachable case, such that the user may use, after all the mosquito repelling essential oil in the case is volatilized, a new replacement case according to demands to continuously repel mosquitos.

Figure 1:
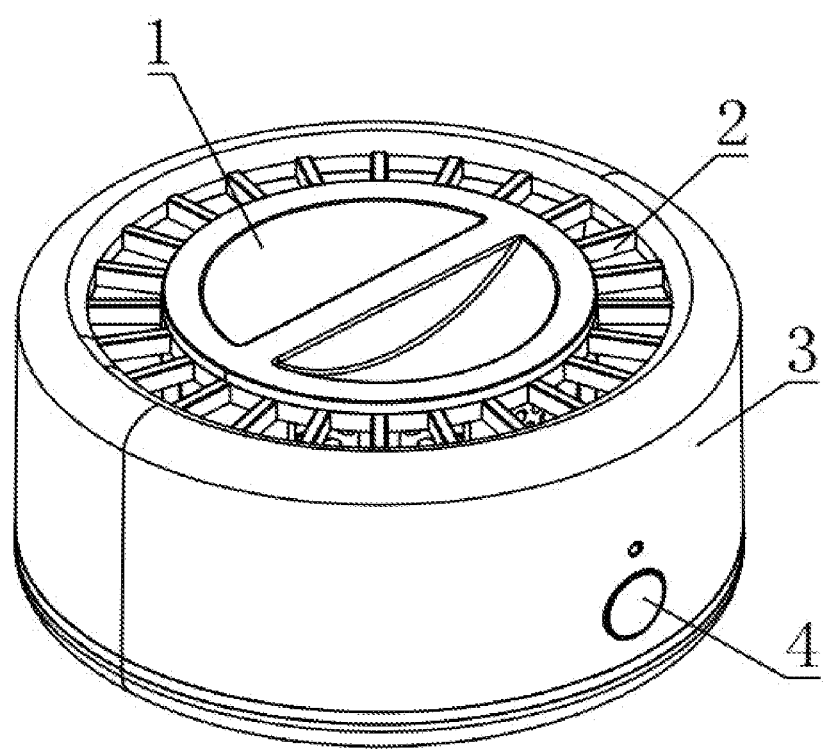
FIG. 1 is a structural schematic view 1 of the portable mosquito repelling device according to an embodiment of the present disclosure.

Reference numerals: 1, end cap, 2, air outlet hole, 3, repelling device body, 4, power button, 5, rubber pad, 6, Type-c power input port, 7, mosquito repelling case, 8, hemispherical wind gathering shell, 9, case placing slot, 10, fan mounting disc.

DETAILED DESCRIPTION

Figure 2:
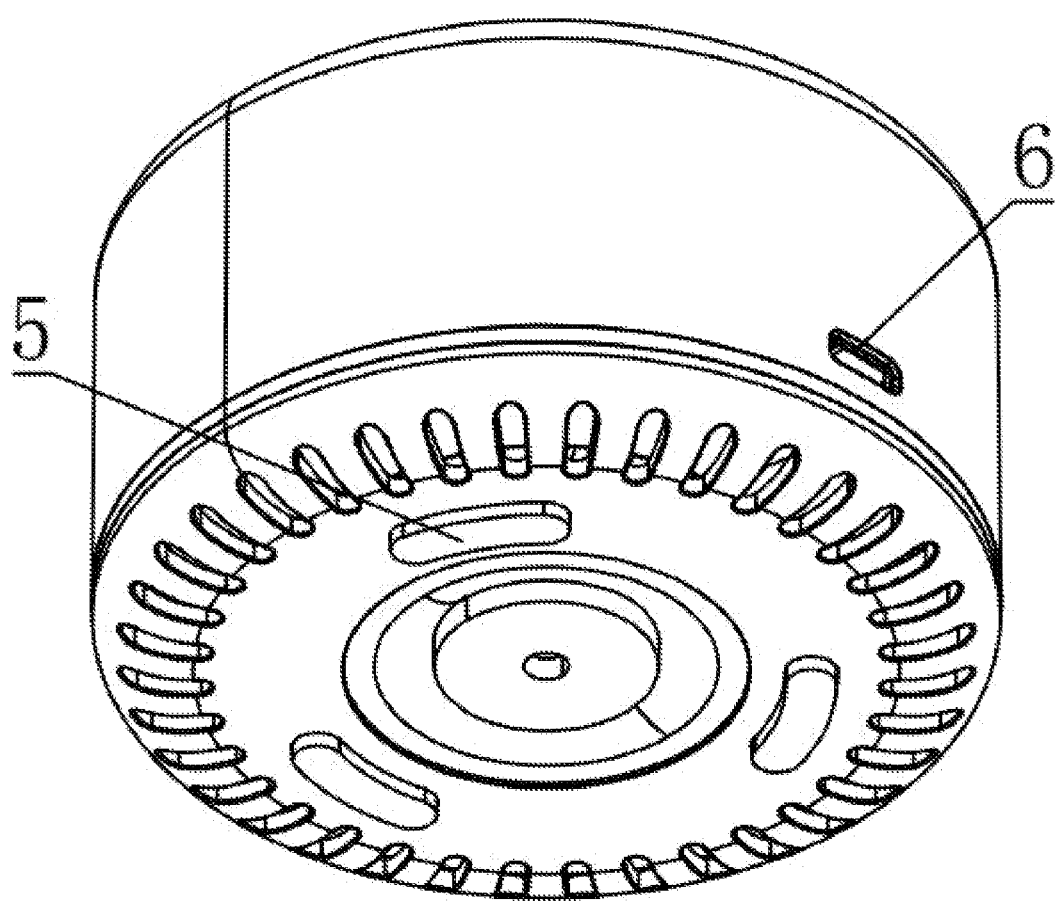
FIG. 2 is a structural schematic view 2 of the portable mosquito repelling device according to an embodiment of the present disclosure.
Figure 3:
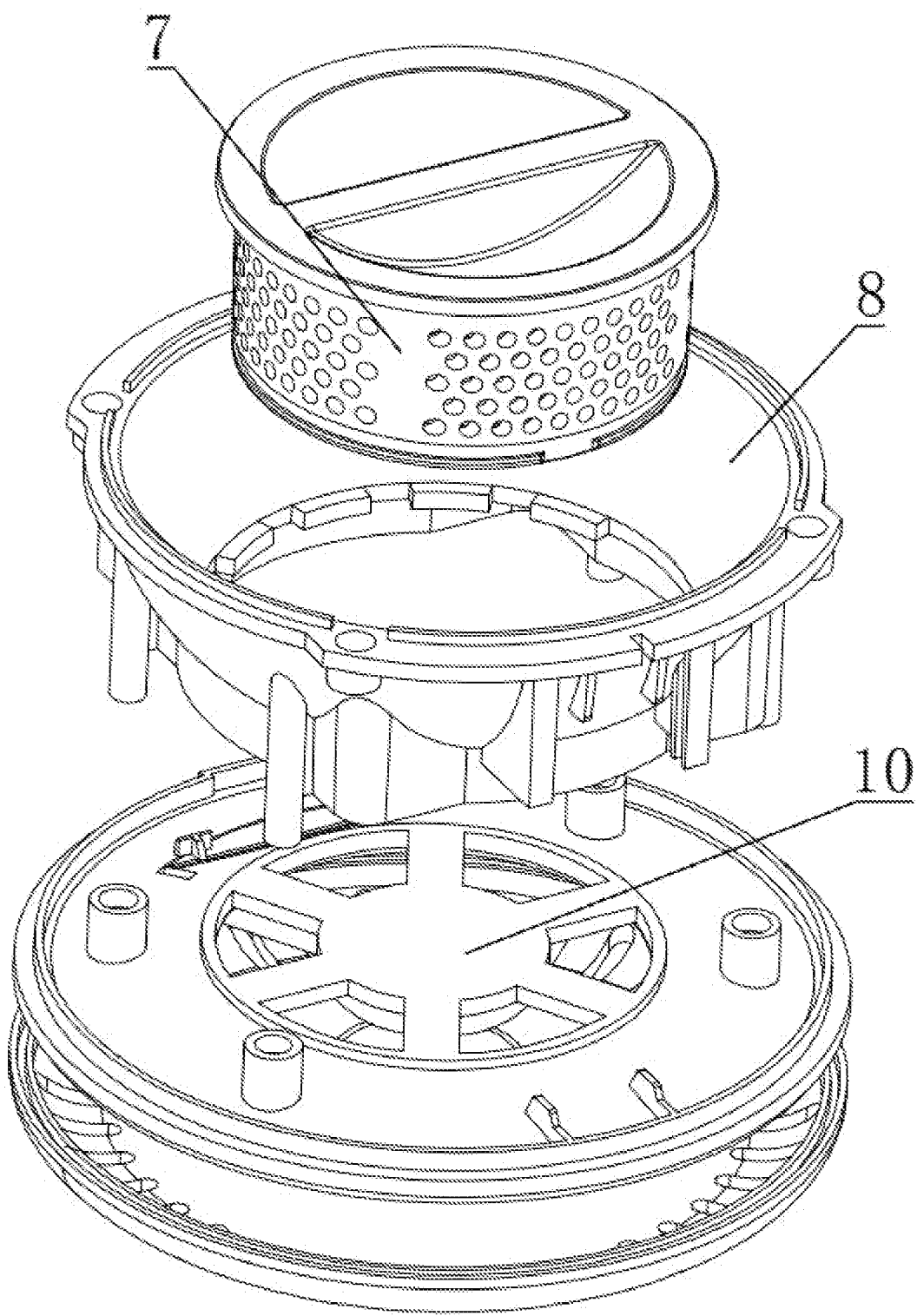
FIG. 3 is an exploded view of the portable mosquito repelling device according to an embodiment of the present disclosure.
Figure 4:
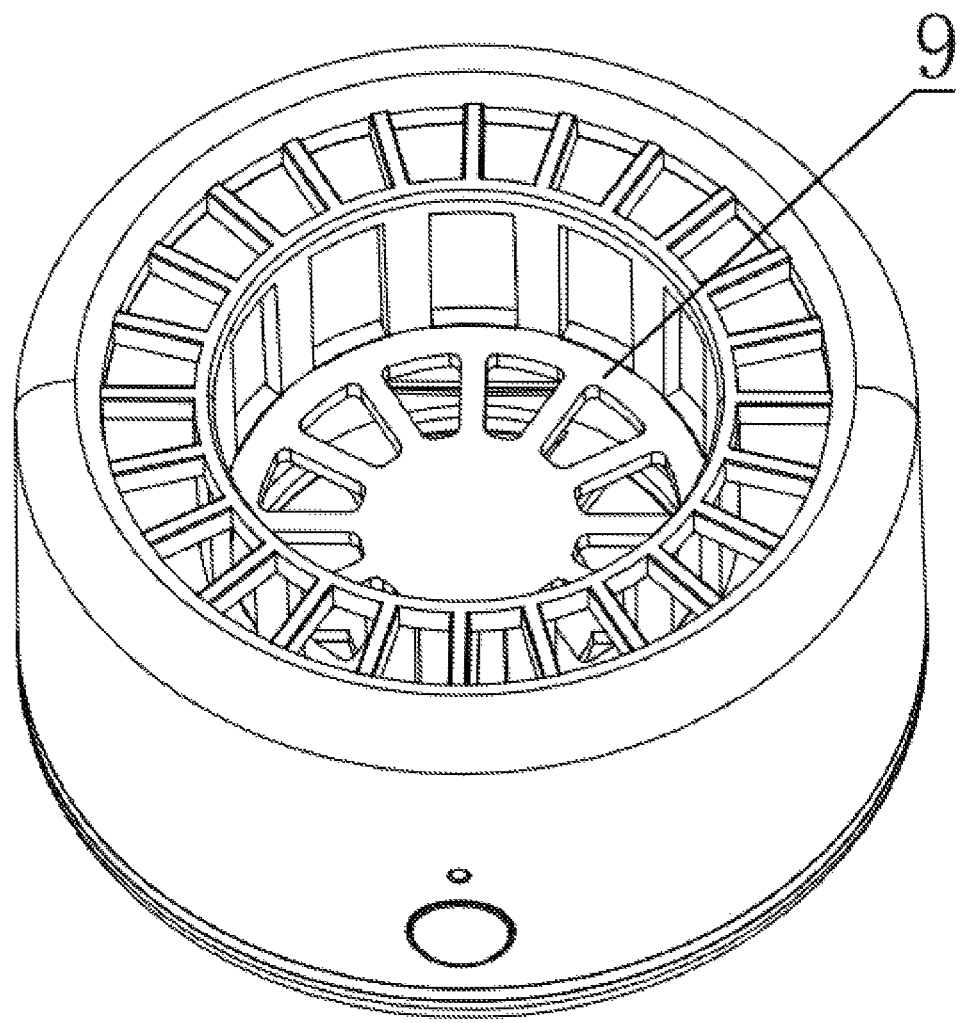
FIG. 4 is a structural schematic view 1 of a portion of the portable mosquito repelling device according to an embodiment of the present disclosure.
Figure 5:
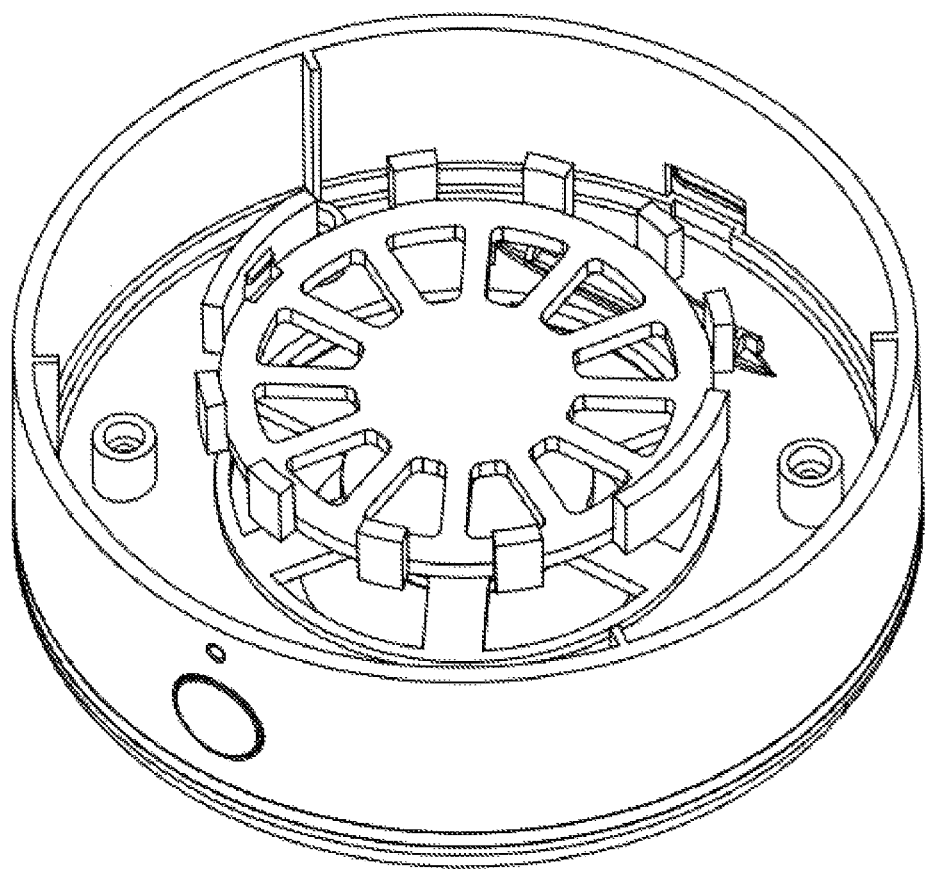
FIG. 5 is a structural schematic view 2 of a portion of the portable mosquito repelling device according to an embodiment of the present disclosure.
Figure 6:
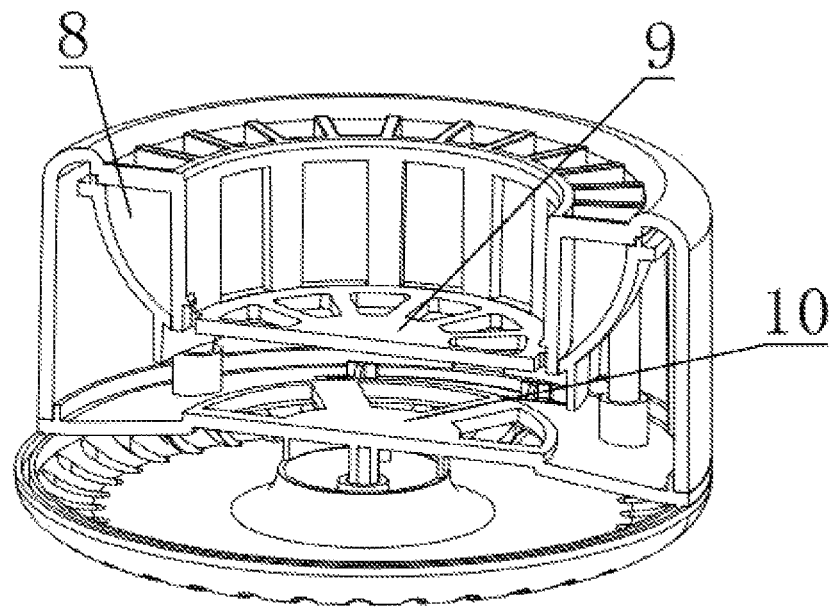
FIG. 6 is a view of a half of the portable mosquito repelling device being cross-sectioned, according to an embodiment of the present disclosure.

Preferred embodiments of the present disclosure are described below by referring to FIGS. 1-FIG. 6 of the accompanying drawings. Any ordinary skilled person in the art shall understand that these embodiments are used only to explain technical principles of the present disclosure and are not intended to limit the scope of the present disclosure.

The present disclosure provides a portable mosquito repelling device. While using the portable mosquito repelling device, thermoplastic rubber adhered with a mosquito repellent essential oil is poured into a mosquito repelling case 7, and an end cap 1 is screwed tightly to prevent the thermoplastic rubber from falling out of the case. The mosquito repelling essential oil containing natural plant components is used instead of medicinal chemical substances contained in a traditional mosquito repellent. In this way, the mosquito repelling essential oil does not contain harmful chemical substances and has no toxic side effects on human health, reducing pollution to the environment. While using the portable mosquito repelling device, it is to be ensured that a rechargeable battery is charged. The battery is inserted into a battery slot, and subsequently, the end cap 1 is unscrewed, a power button 4 is pressed, and a fan rotates to generate wind blowing upwardly. A ring-shaped baffle is engaged with a hemispherical wind gathering shell 8, such that the wind generated by the fan is gathered at a case placing slot 9. The wind flows over the case placing slot 9 and the mosquito repelling case 7 to take the essential oil out of the case. Odour of the mosquito repelling oil is diffused, by the wind (i.e., airflow) generated by the fan, into the surrounding environment. A gear of the fan may be adjusted based on the environment in which the portable mosquito repelling device is being used. When the portable mosquito repelling device is being used outdoors, the gear of the fan may be adjusted to a fast-speed gear. The device in the present disclosure is small sized, easily carried, applicable for both indoors and outdoors, and may provide a full range of protection against mosquitos. When a user is staying outdoors for a long period of time, the user may carry more than one mosquito repelling cases 7. When the mosquito repelling essential oil in one mosquito repelling case 7 is depleted, another mosquito repelling case 7 may be taken to be snapped into the case placing slot 9. Since the mosquito repelling case 7 is detachable, the user may use, after all the mosquito repelling essential oil in one case is completely volatilized, a new replacement case according to demands to continuously repel mosquitos. The portable mosquito repelling device in the present disclosure may also be used based on a Type-c power input port 6. When the portable mosquito repelling device is being used indoors only, the portable mosquito repelling device may be used without inserting the battery.

Although the present disclosure has been described by referring to preferred embodiments, various improvements may be made, and components in the embodiments may be replaced by equivalents without departing from the scope of the present disclosure. In particular, as long as there is no structural conflict, various technical features described in the various embodiments may be combined in any manner. The present disclosure is not limited to particular disclosed embodiments herein, but includes all technical solutions falling within the scope of the claims.

In the description of the present disclosure, terms "center", "top", "bottom", "left", "right", "vertical", "horizontal", "inside", "outside", and so on, indicating directional or positional relationships are based on the orientation or positional relationships shown in the accompanying drawings. The terms are used merely for the purpose of description, and do not indicate or imply that the device or the element must be constructed and operated in a particular orientation. Therefore, the terms shall not be interpreted as a limitation of the present disclosure. Furthermore, the terms "first", "second", "third" are used for descriptive purposes only and shall not be understood as indicating or implying relative importance.

Furthermore, to be noted that in the description of the present disclosure, unless otherwise expressly specified and limited, the terms "mounted", "connected", "coupled" are to be understood in a broad sense. For example, the connection may be fixed connection, detachable connection, or two components being configured as a one-piece and integral structure. The connection may be mechanical connection or electrical connection; direct connection or indirect connection through an intermediate medium, or two elements being internally connected with each other. Any ordinary skilled person in the art shall understand the specific meaning of the above terms in the present disclosure based on specific situations.

Term "includes" or any other similar term are intended to cover non-exclusive inclusion. Therefore, a process, an article or a device/apparatus that includes a series of elements may include not only the listed elements but also other elements that are not explicitly listed or are inherently included in the process, the article or the device/apparatus.

In summary, technical solutions of the present disclosure have been described by referring to the embodiments shown in the accompanying drawings. However, any ordinary skilled person in the art shall understand that that the scope of the present disclosure is obviously not limited to the specific embodiments. Without deviating from principles of the present disclosure, any ordinary skilled person in the art may make equivalent changes or substitutions to the relevant technical features, and technical solutions after the changes or substitutions shall fall within the scope of the present disclosure.

What is claimed is:

1. A portable mosquito repelling device, comprising a repelling device body (3), wherein, a case placing slot (9) is located inside the repelling device body (3); the repelling device body (3) and the case placing slot (9) are connected with each other through a ring-shaped plate; the ring-shaped plate defines a set of air outlet holes (2), which are evenly distributed;

a fan mounting disc (10) is arranged at a lower part of an interior of the repelling device body (3), the fan mounting disc (10) is disposed below the case placing slot (9), the fan mounting disc (10) and the case placing slot (9) are spaced apart from each other;

a mosquito repelling case (7) is snapped into the case placing slot (9), and an end cap (1) is threaded to an upper port of an interior of the mosquito repelling case (7);

wherein a hemispherical wind gathering shell (8) is mounted inside the repelling device body (3), the hemispherical wind gathering shell (8) is disposed at an outer side of the case placing slot (9), an upper portion of the hemispherical wind gathering shell (8) is disposed at a lower side of the ring-shaped plate and supports the ring-shaped plate; a lower portion of the hemispherical wind gathering shell (8) is arranged with a ring-shaped baffle, the ring-shaped baffle is disposed on an upper side of the fan mounting disc (10) and is disposed away from the repelling device body (3).

2. The portable mosquito repelling device according to claim 1, wherein a set of through holes are defined and located at an outer side of the mosquito repelling case (7), the set of through holes are evenly distributed, a through slot is defined out of the case placing slot (9).

3. The portable mosquito repelling device according to claim 1, wherein a power button (4) is arranged at a lower part of a side of the repelling device body (3), and a Type-c power input port is arranged at a lower part of another side of the repelling device body (3).

4. The portable mosquito repelling device according to claim 1, wherein a middle of a lower side of the repelling device body (3) defines a recess, a battery slot is arranged at the recess.

5. The portable mosquito repelling device according to claim 1, wherein a set of rubber pads are arranged at a lower side of the repelling device body (3), and the set of rubber pads are arranged to form a ring.

6. The portable mosquito repelling device according to claim 1, wherein the mosquito repelling case (7) is a detachable mosquito repelling case (7).

\* \* \* \* \*